(No Model.)
W. A. GARRIGUS & R. GOLLING.
NUT LOCK.
No. 604,114. Patented May 17, 1898.
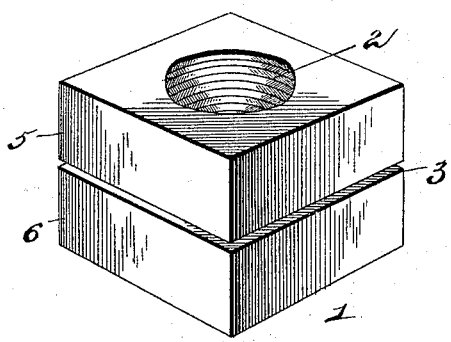
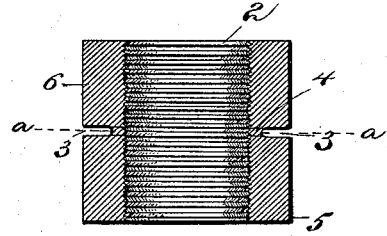
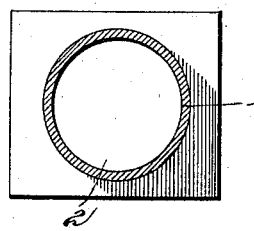
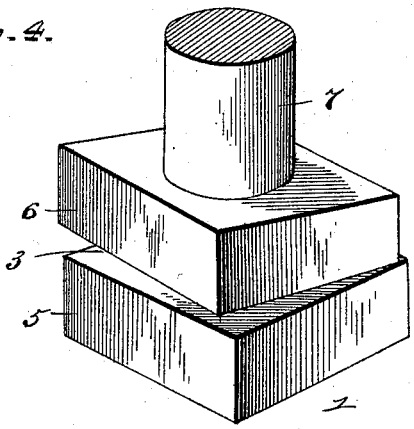
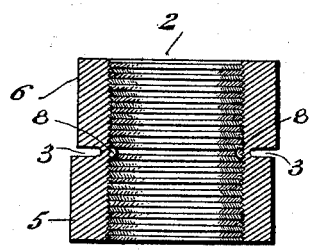
Witnesses
Inventors,
Robert Golling and
Walter A. Garrigus.
By their Attorneys,

UNITED STATES PATENT OFFICE.

WALTER A. GARRIGUS AND ROBERT GOLLING, OF LENOIR CITY, TENNESSEE.

NUT-LOCK.

SPECIFICATION forming part of Letters Patent No. 604,114, dated May 17, 1898.

Application filed May 18, 1897. Serial No. 637,062. (No model.)

*To all whom it may concern:*

Be it known that we, WALTER A. GARRIGUS and ROBERT GOLLING, citizens of the United States, residing at Lenoir City, in the county of Loudon and State of Tennessee, have invented a new and useful Nut-Lock, of which the following is a specification.

This invention relates to certain improvements in nut-locks, and has for its object to provide a device of this character of a simple and inexpensive nature which shall be provided with means for clamping the nut upon the threaded bolt in such a manner as to securely hold the nut against accidental displacement.

The invention consists in a nut-lock consisting of a nut having a threaded opening formed through it in the usual manner to receive the bolt and provided with a groove formed around and extending inward toward the axis of the nut and forming the nut into parts or sections connected with each other by a thin integral metal annulus surrounding said threaded opening, the parts or sections being adapted, when the nut has been screwed into place, to be turned relatively one to the other to move one section toward the other, the thin metal annulus between said sections being forced into clamping engagement with the threads of the bolt.

In order that our improvements may be the better understood, we have shown in the accompanying drawings a nut-locking device constructed in accordance with our invention, in which drawings—

Figure 1 is a perspective view showing a nut provided with our improved locking device, and Fig. 2 is an axial section taken through the same. Fig. 3 is a transverse section taken in the plane indicated by the line *a a* in Fig. 2. Fig. 4 is a perspective view showing the nut applied to a bolt and locked by means of our improved locking devices. Fig. 5 is an axial section taken through the nut as shown in Fig. 4, but showing the bolt removed.

In the drawings, 1 indicates as a whole the nut provided with our improved locking device, this nut being provided with an axial bolt-opening 2, having screw-threads of even pitch throughout its entire length to engage the threads on the bolt in the ordinary manner. The nut is provided with an annular groove or recess 3, cut around its central portion, the inner wall or bottom of said groove or recess being concentric with the bolt-opening 2 and being extended almost to the same, so as to form around the central part of the nut a thin annular web of metal, as shown at 4 in Figs. 2 and 3. By means of said annular groove or recess 3 the body of the nut 1 is divided into two sections or members 5 and 6, these members or sections being, as shown in the drawings, exactly similar to one another, and being connected or tied together by means of said annular web 4, which is formed integrally with the sections or members of the nut.

In using the nut-locking device the nut is first screwed upon the bolt (indicated at 7 in Fig. 4) as far as said nut can be turned, the jaws of the wrench employed in accomplishing this being applied over the sides of both sections or members 5 and 6 of the nut. When the nut has been screwed home, the wrench is removed and its jaws are applied to the outer section or member 6 of the nut alone, and a turning movement is given to said section or member to move the same toward the inner section or member 5. By this movement of the section or member 6 toward the section 5, which is substantially immovable upon the bolt 7, the annular web 4, uniting the sections or members 5 and 6, is twisted so as to crowd or draw said web inward to form an annular bead, as shown at 8 in Fig. 5, projecting inwardly into the hollow 2 of the nut between the sections 5 and 6 thereof and in position to mutilate the screw-threads upon the bolt 7, as will be readily understood, so as to prevent the nut from being unscrewed from the bolt.

From the above description it will be seen that our improved nut-locking device is of an extremely simple and inexpensive construction and is especially adapted for the purposes for which it is designed, since it permits the nut to be locked in place upon the bolt without the employment of any extraneous parts or mechanism; and it will also be obvious from the above description that our invention is susceptible of some modification without material departure from its principles and spirit, and for this reason we do not wish to be understood as limiting ourselves to the precise form and arrangement of the parts herein set forth.

Having thus described our invention, we claim—

1. A nut-lock comprising a nut having throughout the entire length of its bolt-opening threads of even pitch with the bolt to which the nut is to be applied, said nut being provided with a recess dividing it into two integrally-connected sections or members and forming a web arranged at the bolt-opening in position to engage a bolt, whereby when the outer section or member of the nut is jammed upon the inner section or member, the web will be crowded inward for mutilating the threads of the bolt, substantially as described.

2. A nut-lock comprising a nut having throughout the entire length of its bolt-opening threads of even pitch with the bolt to which the nut is to be applied, said nut being provided with an annular recess extending around the same, dividing the nut into two sections or members and forming an annular connecting-web located at the bolt-opening in position for engaging a bolt, whereby when the outer section or member is jammed upon the inner one, the web will be crowded inward for mutilating the threads of the bolt, substantially as described.

In testimony that we claim the foregoing as our own we have hereto affixed our signatures in the presence of two witnesses.

WALTER A. GARRIGUS.
ROBERT GOLLING.

Witnesses:
WM. GOLLING,
GEO. A. GOLLING.